| United States Patent [19] | [11] Patent Number: 4,980,334 |
| Brennan | [45] Date of Patent: Dec. 25, 1990 |

[54] MACROPOROUS ALUMINA/DIATOMACEOUS EARTH BIO-SUPPORTS

[75] Inventor: John F. Brennan, Des Plaines, Ill.

[73] Assignee: UOP, Des Plaines, Ill.

[21] Appl. No.: 406,494

[22] Filed: Sep. 13, 1989

[51] Int. Cl.$^5$ .......................... B01J 21/12; B01J 21/16
[52] U.S. Cl. ...................................... 502/263; 502/412
[58] Field of Search .......................... 502/232, 263, 412

[56] References Cited

U.S. PATENT DOCUMENTS

| 1,570,537 | 1/1926 | Teitsworth | 502/412 |
| 1,970,204 | 8/1933 | Stockton | 502/412 |
| 2,517,036 | 8/1950 | Sensel et al. | 502/412 |
| 2,620,314 | 12/1952 | Hoekstra | 252/448 |
| 3,013,981 | 12/1961 | Riede | 502/412 |
| 4,514,511 | 4/1985 | Jacques et al. | 582/355 |
| 4,581,338 | 4/1986 | Robertson et al. | 582/8 |

Primary Examiner—Carl F. Dees
Attorney, Agent, or Firm—Thomas K. McBride; Eugene I. Snyder; Frank S. Molinaro

[57] ABSTRACT

This invention relates to a whole cell support and a method of preparing the support. The support comprises alumina and diatomaceous earth characterized in that the support has interconnected pores which are at least 5 microns in diameter and preferably has a pore volume greater than about 0.3 mL/g. The support is prepared by forming a mixture of an aluminum sol and a diatomaceous earth forming spheres from the mixture by using the oil drop method and then calcining at a temperature of about 1000° to about 1450° C.

10 Claims, No Drawings

MACROPOROUS ALUMINA/DIATOMACEOUS EARTH BIO-SUPPORTS

BACKGROUND OF THE INVENTION

Enzymes have received considerable attention because of their ability to catalyze various reactions which occur in living organisms. The enzymes may also be isolated and used in industrial applications. For example, the enzyme glucose isomerase is extensively used to convert glucose to fructose in the manufacture of high fructose corn syrup.

Because enzymes are water soluble and generally unstable, they are difficult to remove from the reaction mixture for reuse. Accordingly, this increases the cost of using enzymes on a commercial scale. A solution to this problem has been to immobilize the enzyme by using a porous oxide support on which the enzyme is deposited.

In certain applications it is desirable to use (and immobilize) whole cells of micro-organism. The use of whole cells has the advantage that the cell acts as a carrier for the enzyme and one does not have to extract the enzyme from the cell. If whole cells are to be immobilized on a porous oxide support, the support must have pores which are large enough to accommodate the whole cells. If the pores are too small, the microbial cells or enzymes will plug the pores. Additionally, small pores may cause the fluid with which the whole cells are to be contacted to "hold-up" in the pores, thereby reducing the production rate of product because fresh fluid cannot reach the enzyme present in the whole cell.

Conventional silica, alumina or silica-alumina supports are microporous with micropores of about 0.001 to about 0.03 microns in diameter. These pores are too small to accommodate microbial cells since typically microbial cells are larger than 1 micron. The prior art indicates that pore diameters of about 1 to about 25 microns are needed to adequately accommodate microbial cells. Thus, U.S. Pat. No. 4,581,338 discloses a process for preparing an enzyme support with large macropores. The process involves making a mixture of diatomite, a solvent, a fluxing agent and an organic burnout material, forming the mixture into generally spherical balls and then calcining the balls at a temperature of about 700° to 2300° F. Diatomite or diatomaceous earths are interchangeable terms which refer to sedimentary materials composed of the skeletal remains of single celled aquatic plants called diatoms. The resultant support is stated to have an average pore diameter of at least 8 microns.

Applicant has taken a different approach to making a macroporous support by forming a mixture of an aluminum sol and a diatomaceous earth, forming spheres from this mixture by dropwise dropping the mixture into an oil tower, followed by calcination of the spheres at a temperature of about 1,000° to about 1450° C. The resultant support has pores which are at least 5 microns and which are interconnected. It is important that the pores be interconnected; otherwise whole cells cannot enter the pores and the fluid which is to contact the cells will not be able to diffuse into the large pores. Accordingly, the use of applicant's process produces interconnected macropores without using a burnout material. Applicant's process also produces a uniform, spherical product as compared to the prior art's nearly spherical product.

The prior art also reveals that alumina spheres may be prepared using a suspension of an alumina powder. For example, U.S. Pat. No. 4,514,511 teaches that a mixture of an alumina powder and an aluminum salt can be used to form spheres with pores having a diameter from about 0.2 to 15 microns. However, these pores are closed which would make them useless as a support for whole cells. Applicants are, therefore, the first to prepare an alumina/diatomaceous earth macroporous support, having interconnected pores.

SUMMARY OF THE INVENTION

This invention relates to a whole cell support and a method of preparing the support. Accordingly, one embodiment of the invention is a whole cell support comprising alumina and diatomaceous earth characterized in that the support has interconnected pores which are at least 5 microns in diameter.

Another embodiment of the invention is a process for preparing a whole cell support comprising forming a mixture of an aluminum sol and a sufficient amount of a diatomaceous earth, forming said mixture into spheres by dropping said mixture into an oil tower, isolating the spheres and calcining the spheres at a temperature and for a time sufficient to form a catalyst support having interconnected pores which are at least 5 microns in diameter.

Other objects and embodiments of this invention will become apparent in the following detailed description of the invention.

DETAILED DESCRIPTION OF THE INVENTION

As stated, this invention relates to a whole cell support and a method of preparing the support. Generally, the method of preparation involves first making an aluminum sol by means well known in the art. For example, aluminum can be reacted with hydrochloric acid to provide an Al/Cl sol (see U.S. Pat. No. 2,620,314). A sol is a liquid composition which, when placed between one's line of vision and a strong light source, shows a bluish cast. This is known as the Tyndall effect.

Having formed the aluminum sol, the next step involves forming a mixture of the aluminum sol and a diatomaceous earth powder. As stated, diatomaceous earths are sedimentary materials composed of the skeletal remains of single celled aquatic plants called diatoms. Many diatomaceous earth deposits were laid down by sedimentation in shallow waters many years ago. Subsequent geologic uplift has raised these beds to positions where they can be mined by conventional methods. Once mined, the diatomaceous earths are washed, dried and then sold or they may be treated with a fluxing agent such as $CACO_3$, $Na_2CO_3$ or $K_2CO_3$ and then calcined prior to sale. These latter materials are referred to as flux-calcined diatomaceous earths. Typically, diatomaceous earths are composed of 86-90% silica, 3-4% alumina, about 1% alkaline oxides, about 1% other oxides and the remainder water (if not flux calcined). The flux-calcined materials will contain 2-4% alkaline oxides.

The particle size of the diatomaceous earths can vary considerably and can determine the size of the macropores of the catalyst support. When the diatomaceous earth is mixed with the aluminum sol one obtains a mixture which consists of discrete particles of the diatomaceous earth in a sol matrix. Accordingly, the size of the particles determines the amount of sol between the particles, i.e., how the particles pack, which determines the pore size of the final product. It has been determined that it is necessary that at least 10 weight percent and preferably at least 40 weight percent of the total diatomaceous earth have a median particle diameter greater than 40 microns and the remainder of the diatomaceous earth have a median particle size smaller than 40 microns and preferably in the range of about 7 to about 15 microns. Because the particle size of diatomaceous earth varies based on the source of the earth, it may be necessary to blend diatomaceous earths from various sources in order to obtain the desired particle size distribution. Alternatively, the large particle diatomaceous earth can be ground by conventional means to give smaller diameter particles.

The amount of diatomaceous earth which is added to the aluminum sol can vary considerably, but in generally chosen to give an amount in the final product from about 40 to about 75 weight percent and preferably from about 55 to about 70 weight percent. Increasing the amount of diatomaceous earth present in the sol has the effect of decreasing the ABD (apparent bulk density), surface area and crushing strength, while increasing the attrition of the resultant product. Additionally, increasing the amount of diatomaceous earth increases the total pore volume of the finished product. This is owing to the fact that the diatomaceous earth is more sinterable than the alumina, thereby forming more and/or greater voids. It is desirable that the support have a pore volume of greater than 0.3 ml/g.

Before the above mixture is dropped into an oil tower, it is necessary to add a gelling agent. One suitable gelling agent is hexamethylene tetramine. (For specific details on the basic oil dropping procedure see U.S. Pat. No. 2,620,314 which is incorporated by reference.) The resultant mixture is dropped into an oil bath maintained at elevated temperatures. The droplets of the mixture remain in the oil bath until they set and form hydrogel spheres. The spheres are then continuously withdrawn from the oil bath and typically subjected to specific aging and drying treatments in oil and an ammoniacal solution to further improve their physical characteristics. The resulting aged and gelled particles are then washed and dried at a relatively low temperature of about 140°–205° C. and subjected to a calcination procedure at a temperature of about 455°–705° C. for a period of 1 to about 20 hours. The calcined spheres are next sintered at a temperature of about 1000° to about 1450° C. and preferably from about 1350° to about 1400° C. for a time from about 1 to about 4 hours.

In a preferred embodiment, a fluxing agent is added to the spheres to lower the sintering temperature. One way to do this is to impregnate the diatomaceous earth with a fluxing agent. Fluxing agents are usually Group I or Group II metal compounds which decompose on heating to give the metal oxide. Preferred fluxing agents may be selected from the group consisting of magnesium carbonate, calcium carbonate, cesium carbonate, lithium carbonate, potassium carbonate and sodium carbonate. Other fluxing agents include the acetate and nitrate salts of the Group I and Group II metals. The amount of fluxing agent to be added to the mixture can vary considerably but is usually from about 1 to about 20 weight percent and preferably from about 5 to about 15 weight percent of the diatomaceous earth.

The support which is obtained is characterized as having pores which are at least 5 microns in diameter. Generally, the pores have diameters in the range of about 5 to about 20 microns. The pores are also interconnected, thereby allowing fluid to easily enter and leave the large pores. The fact that the pores are interconnected was shown by mercury intrusion analysis and scanning electron microscopy (SEM). It is preferred that the large pores provide a pore volume of greater than 0.3 ml/g (for pores greater than 5 microns) as measured by mercury intrusion.

As stated, the support which is one of the embodiments of this invention is useful as a support for enzymes or microbial cells. Additionally, the support may be used to disperse other catalytic materials such as noble metals, any of the Group VIII metals, etc. Since the support has such large pores, it is especially suited for applications which may be diffusionally limited. The support may be used as is or it may be broken up into smaller irregularly shaped particles. This helps to increase the contact between the catalyst and the stream to be treated and decreases the back pressure.

The following examples are presented in illustration of this invention and are not intended as undue limitations on the generally broad scope of the invention as set out in the appended claims.

EXAMPLE 1

A flux-calcined diatomaceous earth having a median particle size greater than 40 microns (obtained from Ceca SA and identified as Clarcel grade) was mixed with a washed diatomaceous earth having a median particle size of about 15 microns (obtained from Eagle Picher Co. and identified as MN-2 grade). This powder mixture was mixed with an aluminum sol which was prepared by dissolving aluminum metal in hydrochloric acid to give an Al/Cl ratio of about 1.03. The relative amounts of materials present was such as to provide 41% of the flux calcined diatomaceous earth; 21% of the washed diatomaceous earth and 38% alumina on the finished product. Hexamethylene tetramine was added to the mixture to gel the mixture into spheres when dropped through a tower of oil maintained at 95° C. The amount of hexamethylene tetramine which was added was about 105% of the amount required to neutralize the acid in the aluminum sol.

After the spheres were removed from the hot oil, they were pressure aged at 135° C. and washed with a dilute (1.85 weight percent NH$_4$OH) ammonium hydroxide solution, dried at 110° C. and calcined at 650° C. for about 2 hours. The calcined spheres (1/16 inch in diameter) were heated at 1450° C. for 4 hours and analyzed by mercury intrusion and SEM (scanning electron microscope). The results obtained showed that only pores in the 5–20 micron were present, that the pore volume was about 0.35 mL/g and that the spheres had roughly circular pores homogeneously distributed throughout the sphere. These pores were also found to be interconnected.

EXAMPLE 2

Spheres were prepared as in Example 1 except that only the Clarcel grade diatomaceous earth was mixed with the aluminum sol in an amount sufficient to give 52% Clarcel and 47% alumina in the finished product. Again, the calcined spheres were heated at 1450° C. for 4 hours and analyzed by SEM and mercury intrusion. Again 5–20 micron pores were present, but the pore volume of these pores was only 0.18 mL/g. The pore structure of these spheres was the same as those of Example 1.

This example shows that increasing the amount of alumina in the product and using only one size of diatomaceous earth decreases the pore volume of the spheres.

I claim as my invention:

1. A whole cell support comprising alumina and diatomaceous earth characterized in that the support has interconnected pores which are at least 5 microns in diameter.

2. The support of claim 1 where the support is in the shape of spheres.

3. The support of claim 1 where the diatomaceous earth is present in a concentration from about 40 to about 75 weight percent of the support.

4. The support of claim 3 where the support has a pore volume greater than 0.3 mL/g.

5. The support of claim 1 where at least 10% of the diatomaceous earth is present as particles having an average particle diameter greater than 40 microns.

6. A process for preparing a whole cell support comprising forming a mixture of an aluminum sol and a sufficient amount of a diatomaceous earth, forming said mixture into spheres by dropping said mixture into an oil tower, isolating the spheres and calcining the spheres at a temperature and for a time sufficient to form a whole cell support having interconnected pores which are at least 5 microns in diameter.

7. The process of claim 6 where the diatomaceous earth is present in the mixture in an amount sufficient to give an amount in the catalyst support from about 40 to about 75 weight percent of the mixture.

8. The process of claim 6 where the calcining is carried out at a temperature of about 1000° to about 1450° C. for a time of about 1 to about 4 hours.

9. The process of claim 6 where at least 10% of the diatomaceous earth is present as particles having an average particle diameter greater than 40 microns.

10. The process of claim 6 where the mixture contains a fluxing agent selected from the group consisting of lithium carbonate, calcium carbonate, magnesium carbonate, potassium carbonate and sodium carbonate and the fluxing agent is present in an amount from about 1 to about 20 weight percent of the diatomaceous earth.

* * * * *